(12) United States Patent
Bozak et al.

(10) Patent No.: US 7,627,655 B2
(45) Date of Patent: Dec. 1, 2009

(54) INCREASED PERFORMANCE OF GRID APPLICATIONS

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1141 days.

(21) Appl. No.: 11/010,882

(22) Filed: Dec. 13, 2004

(65) Prior Publication Data

US 2006/0130066 A1 Jun. 15, 2006

(51) Int. Cl.
 G06F 15/16 (2006.01)
 G06F 15/173 (2006.01)
 G06F 15/177 (2006.01)

(52) U.S. Cl. ............................ 709/220; 717/140; 707/1

(58) Field of Classification Search ......... 709/217–228; 717/140; 707/1
See application file for complete search history.

(56) References Cited

U.S. PATENT DOCUMENTS

| | | | | |
|---|---|---|---|---|
| 7,124,062 B2 * | 10/2006 | Gebhart | ...................... | 702/186 |
| 2004/0123296 A1 * | 6/2004 | Challenger et al. | .......... | 718/102 |
| 2005/0138156 A1 * | 6/2005 | Gebhart et al. | .............. | 709/223 |
| 2005/0193222 A1 * | 9/2005 | Greene | ...................... | 713/201 |
| 2006/0036426 A1 * | 2/2006 | Barr et al. | ..................... | 703/22 |
| 2006/0126639 A1 * | 6/2006 | Bozak et al. | ........... | 370/395.21 |
| 2006/0136506 A1 * | 6/2006 | Gebhart et al. | .............. | 707/202 |
| 2006/0136883 A1 * | 6/2006 | Gebhart et al. | .............. | 717/140 |
| 2006/0136884 A1 * | 6/2006 | Gebhart et al. | .............. | 717/140 |
| 2006/0136917 A1 * | 6/2006 | Gebhart et al. | .............. | 718/100 |
| 2006/0168174 A1 * | 7/2006 | Gebhart et al. | .............. | 709/223 |
| 2006/0168352 A1 * | 7/2006 | Gebhart et al. | .............. | 709/248 |
| 2007/0061277 A1 * | 3/2007 | Boden et al. | ................... | 707/1 |
| 2007/0112574 A1 * | 5/2007 | Greene | ......................... | 705/1 |

* cited by examiner

*Primary Examiner*—Haresh N Patel
(74) *Attorney, Agent, or Firm*—Finnegan, Henderson, Farabow, Garrett & Dunner, LLP

(57) ABSTRACT

A method includes identifying a component within a non-distributed grid-enabled software application that can be isolated and independently executed during an execution of the software application on a first compute resource within a grid network, replacing the isolatable component in the software application with a proxy, and executing the software application on the first compute resource with the isolated component executing on a second compute resource.

33 Claims, 4 Drawing Sheets

INCREASED PERFORMANCE OF GRID APPLICATIONS

TECHNICAL FIELD

The present invention relates to data processing by digital computer, and more particularly to increased performance of grid applications.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for increased performance of grid applications in a grid network. In one aspect, the invention features a method including identifying a component within a non-distributed software application that can be isolated and independently executed during an execution of the software application on a first compute resource within a grid network, replacing the isolatable component in the software application with a proxy in the grid network, and executing the software application on the first compute resource with the isolated component executing on a second compute resource in the grid network.

In embodiments, the software application can include a Java application having a plurality of classes, the isolated component representing a first class with the Java application. The proxy can communicate between the Java application on the first compute resource and a Java Virtual Machine (JVM) on the second compute resource.

Identifying can include receiving a list of components, executing a byte code analyzer to inspect byte code representing components in the list, and determining which of the components contained in the list can be separated from the software application. Determining can include selecting a critical component.

Replacing can include distributing the isolated component to the second compute resource prior to the execution of the application. Executing can include invoking the isolatable component on the second compute resource. Executing can also include executing the isolatable component on the first compute resource if a network connection between the first compute resource and the second compute resource can be lost. Executing can also include executing the isolatable component on the first compute resource if an error occurs during execution of the isolatable component on the second compute resource.

In another aspect, the invention features a method including, in a grid network, distributing an isolatable component of a non-distributed software application residing on a first compute resource to a second compute resource, and replacing the isolatable component in the non-distributed software application with a proxy that communicates with the isolatable component on the second compute resource.

In embodiments, the method can include executing the non-distributed software application on the first compute resource. Executing can include executing the isolatable component on the second compute resource as directed by the proxy.

Distributing can include sending the isolatable component to the second compute resource prior to an execution of the non-distributed software application on the first compute resource.

Distributing can include sending the isolatable component to the second compute resource during an execution of the non-distributed software application on the first compute resource.

The non-distributed software application can be a Java application and the isolatable component can be a Java class.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
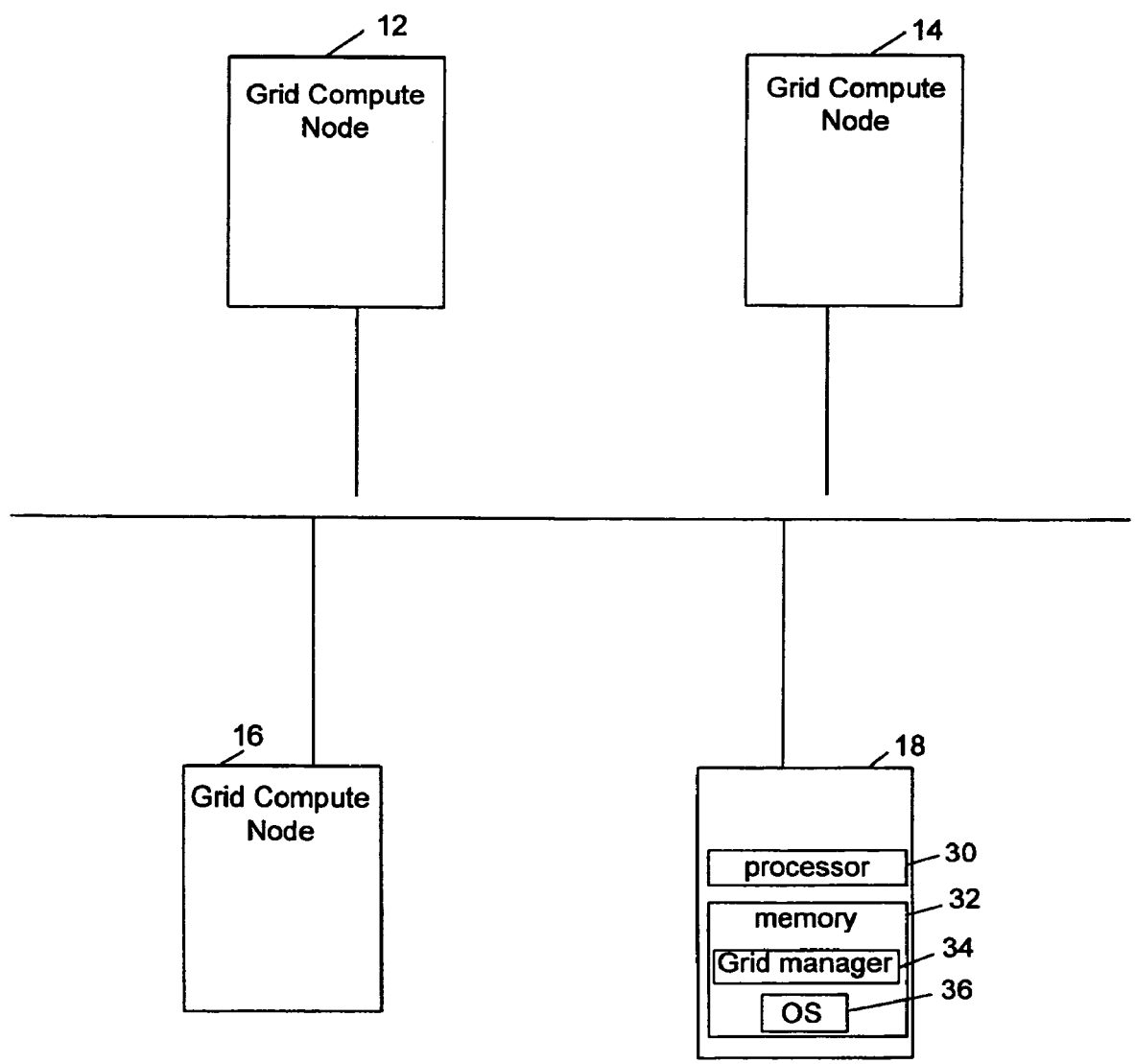
FIG. 1 is block diagram.

As shown in FIG. 1, a grid network 10 in accordance with one embodiment of the invention includes a number of interconnected grid compute nodes 12, 14, 16, 18. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18 for example, can include a processor 30 and a memory 32. Memory 32 includes a grid manager 34 and an operating system (OS) 36, such as Unix, Linux or Windows.

Each of the grid compute nodes 12, 14, 16, and 18 include applications capable of executing in response to a request to perform a task. Certain non-distributed applications can be performance enhanced through transparent distribution of isolatable parts (e.g., components) of the applications, without having to modify the application code. This is achieved by separating and replacing performance critical application components of a non-distributed grid-enabled application transparently with proxies and by distributing the separated components to grid compute nodes that allow faster execution.

In one particular example, performance enhancement through transparent component distribution is explained below in a Java application context. However, it should be realized that the following principles apply to any type of non-distributed application in which one can replace performance critical application components of the application transparently with proxies and distribute the separated components to grid compute nodes, allowing faster execution.

Sun Microsystem's Java is a programming language expressly designed for use in the distributed among servers and clients in a network.

Java compiles source code into Java byte code, which can be run anywhere in a network on a server or client that has a Java virtual machine. The Java virtual machine interprets the byte code into code that will run on the real computer hardware.

Within a Java application environment, a performance profile is generated for a non-distributed grid-enabled application. The performance profile provides information on which components of the grid-enabled application are performance critical and need to be enhanced. A component generally includes a sequence of instructions referred to as a stub. A byte code analyzer is used to inspect the grid-enabled application's byte code and determine which of the performance critical components can be separated from the grid-enabled application and executed in an isolated manner.

In a particular example, the byte code analyzer is a Java byte code analyzer. The Java byte code analyzer parses java class files and presents the information in a tree format, with details on each node shown in a panel when a tree node is selected. Byte code is computer object code that is processed by a program, usually referred to as a virtual machine, rather than by the "real" computer machine, the hardware processor. The virtual machine converts each generalized machine instruction into a specific machine instruction or instructions that this computer's processor will understand. Byte code is the result of compiling source code written in a language that supports this approach. A well-known language that uses the byte code and the virtual machine approach is Java.

Figure 2:
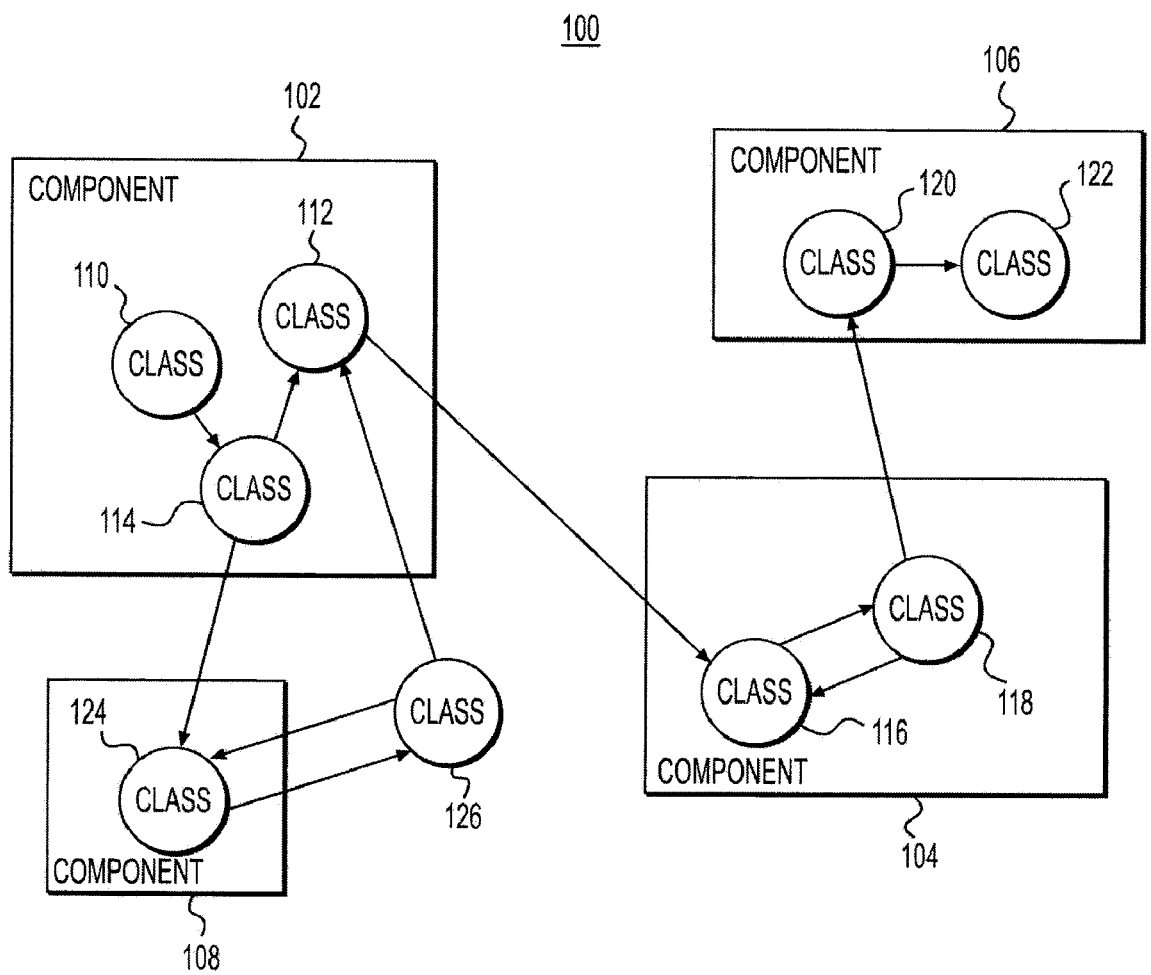
FIG. 2 is a block diagram.

As shown in FIG. 2, an exemplary application 100 includes four components 120, 104, 106, 108. Component 102 includes classes 110, 112, 114. Component 104 includes classes 116, 118. Component 106 includes classes 120, 122. Component 108 includes class 124. Application 100 also includes a class 126. Multiple classes can be distributed as one component, where component refers to a set of classes that belong together, if these classes are separable (i.e., isolatable) from the entire application 100. In Java, a set of classes is isolatable if, for example, no references exist from the component to the outside, i.e., the component is only referenced from the other classes. In application 100, component 106 is isolatable since only class 118 references class 108 at runtime. If class 120 is replaced by a proxy with the same class signature (i.e., from the outside the proxy looks like class 120), component 106, which includes classes 120, 122, can be distributed. There are other criteria, such as statelessness and reduced data exchange between isolatable components, which can make the distribution easier and more reasonable. The more data that is exchanged between class 118 and class 120 at runtime the less it makes sense to distribute component 106. Thus, there are situations where it makes sense to distribute single classes and multiple classes.

Figure 3:
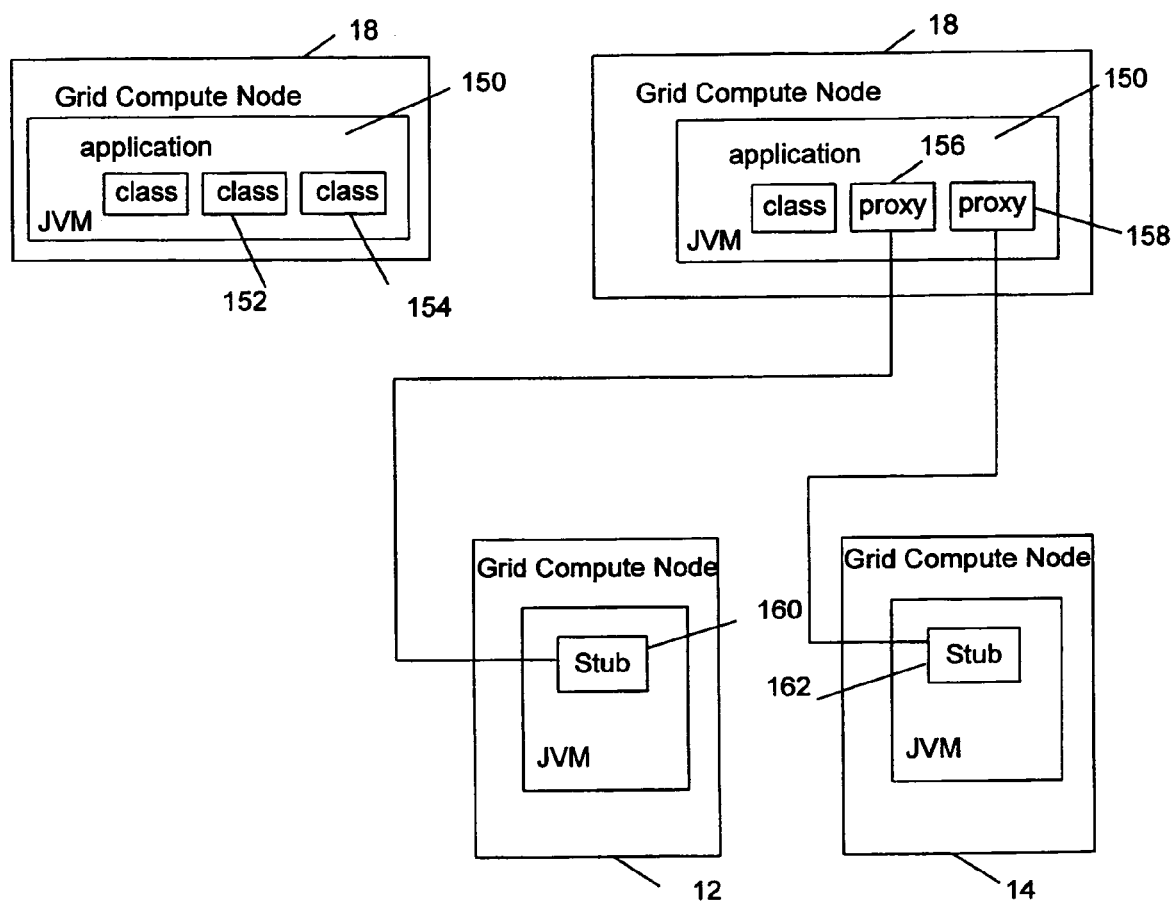
FIG. 3 is a block diagram.

As shown in FIG. 3, if the byte code analyzer identifies critical application components of an application 150 that can be separated, such as class 152 and class 154, class proxies, e.g., class proxy 156 and class proxy 158, are inserted into the application 50. Stubs representing class 152 and class 154, e.g., stub 160 and stub 162, are distributed to other grid compute resources, e.g., grid compute resource 14 and grid compute resource 16. The proxies 156, 158 have the same class signatures as their original classes 152, 154, respectively, so that the proxies 156, 158 are loaded by the application 150 at runtime instead of the classes 152, 154. The insertion of proxies 156, 158 and the distribution of stubs 160, 162 can occur dynamically during runtime or statically before execution of application 150. In either event the grid network 10 provides an infrastructure and links between the proxies 156, 158 and stubs 160, 162. During runtime of the application 150 all method invocations to the proxies 156, 158 are forwarded to the corresponding stubs 160, 162.

Figure 4:
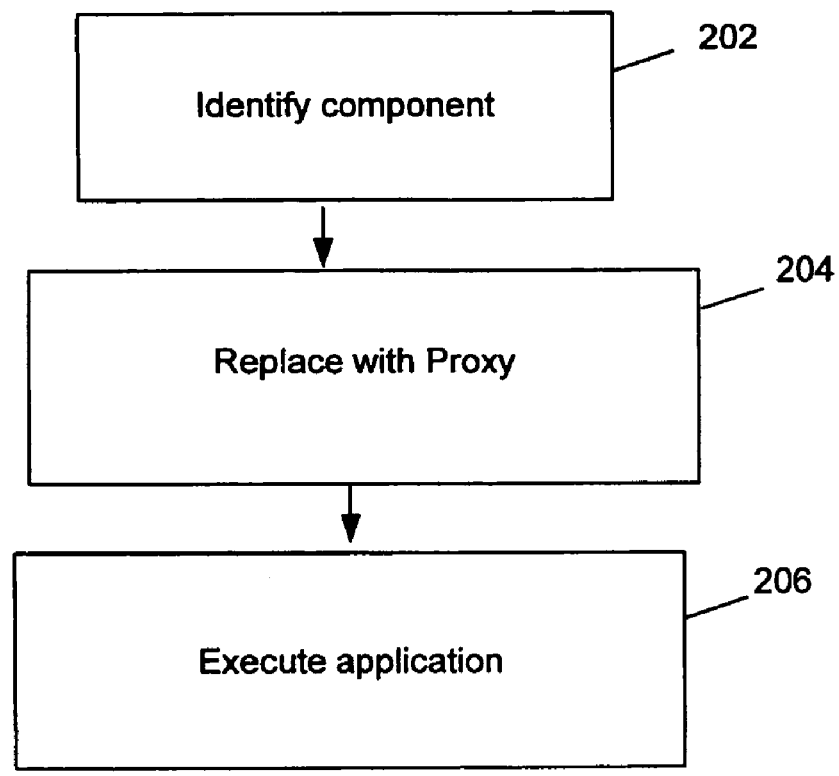
FIG. 4 is a flow diagram.
Like reference symbols in the various drawings indicate like elements.

As shown in FIG. 4, a grid-enhanced performance application process 200 includes identifying (202) a component within a non-distributed grid-enabled software application that can be isolated and independently executed during an execution of the software application on a first compute resource within a grid network. The software application can include a Java application having a number of classes, the isolated component representing a first class with the Java application. A proxy communicates between the Java application on the first compute resource and a Java Virtual Machine (JVM) on the second compute resource.

Identifying (202) can include receiving a list of components, executing a byte code analyzer to inspect byte code representing components in the list, and determining which of the components contained in the list can be separated from the software application. Determining can include selecting a critical component.

Process 200 replaces (204) the isolatable component in the software application with a proxy in the grid network. Replacing (204) can include distributing the isolated component to the second compute resource prior to the execution of the application.

Process 200 executes (206) the software application on the first compute resource with the isolated component executing on a second compute resource in the grid network. Executing (206) can include invoking the isolatable component on the second compute resource.

Executing (206) can include executing the isolatable component on the first compute resource if a network connection between the first compute resource and the second compute resource is lost.

Executing (206) can include executing the isolatable component on the first compute resource if an error occurs during execution of the isolatable component on the second compute resource.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, since parts of an application are executed remotely there is an increase risk of execution errors. A switch can be installed in an application that cause component execution to occur in the grid compute node where the main application resides in the event of a network or other error occurring in the remote grid compute node to which the proxy points.

What is claimed is:

1. A method comprising:
    identifying, by a first grid compute resource on a grid network, an application component within a non-distributed grid-enabled software application that can be isolated and executed independently of the software application on a second grid compute resource on the grid network during execution of the software application on the first grid compute resource;
    replacing, by the first grid compute resource, the isolatable component in the software application with a proxy component having the same class signature as the isolatable component;
    executing the software application including the proxy component on the first grid compute resource;
    generating, by the first grid compute resource, a stub including the isolatable component that was replaced with the proxy component; and
    distributing, by the first grid compute resource, the stub including the isolatable component to the second grid compute resource for execution by the second grid compute resource.

2. The method of claim 1 wherein the software application comprises a Java application having a plurality of classes, the isolated component representing a first class within the Java application.

3. The method of claim 2 wherein the proxy component communicates between the Java application on the first grid compute resource and a Java Virtual Machine (JVM) on the second grid compute resource.

4. The method of claim 2 wherein identifying comprises:
    receiving a list of components;
    executing a byte code analyzer to inspect byte code representing components in the list; and
    determining which of the components contained in the list can be separated from the software application.

5. The method of claim 4 wherein determining comprises selecting a critical component.

6. The method of claim 1 wherein replacing comprises distributing the isolated component to the second grid compute resource prior to the execution of the application.

7. The method of claim 1 wherein executing comprises invoking the isolatable component on the second grid compute resource.

8. The method of claim 1 wherein executing further comprises executing the isolatable component on the grid first compute resource if a network connection between the first grid compute resource and the second grid compute resource is lost.

9. The method of claim 1 wherein executing comprises executing the isolatable component on the first grid compute resource if an error occurs during execution of the isolatable component on the second grid compute resource.

10. A method for executing a non-distributed grid-enabled software application on a grid network, the method comprising:
    identifying, by a first grid compute resource on the grid network, an application component within the software application that can be isolated and executed independently of the software application on a second grid compute resource on the grid network while the software application is being executed on the first grid compute resource;
    distributing, by the first grid compute resource, a stub including the isolatable component of the non-distributed grid-enabled software application to the second grid compute resource for execution on the second grid compute resource;
    replacing, by the first grid compute resource, the isolatable component in the non-distributed software application with a proxy component having the same class signature as the isolatable component that communicates with the isolatable component being executed on the second grid compute resource; and
    executing, by the first grid compute resource, the software application including the proxy component.

11. The method of claim 10 further comprising executing the non-distributed software application on the first grid compute resource.

12. The method of claim 11 wherein executing comprises executing the isolatable component on the second grid compute resource as directed by the proxy.

13. The method of claim 10 wherein distributing comprises sending the isolatable component to the second grid compute resource prior to an execution of the non-distributed software application on the first grid compute resource.

14. The method of claim 10 wherein distributing comprises sending the isolatable component to the second grid compute resource during an execution of the non-distributed software application on the first grid compute resource.

15. The method of claim 10 wherein the non-distributed software application is a Java application and the isolatable component is a Java class.

16. A computer-readable storage medium storing a computer program which, when executed by a first grid compute resource on a grid network, causes the first grid compute resource to execute a method for increasing performance of a non-distributed grid-enabled software application, the method comprising:

identifying, by the first grid compute resource, a component within the non-distributed software application that can be isolated and executed independently of the software application on a second grid compute resource on the grid network during execution of the software application on the first grid compute resource;

replacing, by the first grid compute resource, the isolatable component in the software application with a proxy component having the same class signature as the isolatable component;

executing the software application including the proxy component on the first grid compute resource;

generating, by the first grid compute resource, a stub including the isolatable component that was replaced by the proxy component;

distributing, by the first grid compute resource, the stub including the isolatable component to the second grid compute resource for execution by the second grid compute resource.

17. The computer-readable storage medium of claim 16 wherein the software application comprises a Java application having a plurality of classes, the isolated component representing a first class with the Java application.

18. The computer-readable storage medium of claim 17 wherein the proxy component communicates between the Java application on the first grid compute resource and a Java Virtual Machine (JVM) on the second grid compute resource.

19. The computer-readable storage medium of claim 17 wherein identifying comprises:

receiving a list of components;

executing a byte code analyzer to inspect byte code representing components in the list; and determining which of the components contained in the list can be separated from the software application.

20. The computer-readable storage medium of claim 19 wherein determining comprises selecting a critical component.

21. The computer-readable storage medium of claim 16 wherein replacing comprises distributing the isolated component to the second grid compute resource prior to the execution of the application.

22. The computer-readable storage medium of claim 16 wherein executing comprises invoking the isolatable component on the second grid compute resource.

23. The computer-readable storage medium of claim 16 wherein executing further comprises executing the isolatable component on the first grid compute resource if a network connection between the first grid compute resource and the second grid compute resource is lost.

24. The computer-readable storage medium of claim 16 wherein executing comprises executing the isolatable component on the first grid compute resource if an error occurs during execution of the isolatable component on the second grid compute resource.

25. A first grid compute resource on a grid network, comprising:

a processor configured to:

identify a component within a non-distributed grid-enabled software application that can be isolated and executed independently of the software application on a second grid compute resource on the grid network during execution of the software application on the first grid compute resource;

replace the isolatable component in the software application with a proxy component having the same class signature as the isolatable component;

replace the software application including the proxy component on the first grid compute resource;

generate a stub including the isolatable component that was replaced with the proxy component; and distribute the stub including the isolatable component to the second grid compute resource for execution by the second grid compute resource.

26. The system of claim 25 wherein the software application comprises a Java application having a plurality of classes, the isolated component representing a first class with the Java application.

27. The system of claim 26 wherein the proxy communicates between the Java application on the first grid compute resource and a Java Virtual Machine (JVM) on the second grid compute resource.

28. The system of claim 26 wherein the identifying comprises:

receiving a list of components;

executing a byte code analyzer to inspect byte code representing components in the list; and determining which of the components contained in the list can be separated from the software application.

29. The system of claim 28 wherein determining comprises selecting a critical component.

30. The system of claim 25 wherein replacing comprises distributing the isolated component to the second grid compute resource prior to the execution of the application.

31. The system of claim 25 wherein executing comprises invoking the isolatable component on the second grid compute resource.

32. The system of claim 25 wherein executing further comprises executing the isolatable component on the first grid compute resource if a network connection between the first grid compute resource and the second grid compute resource is lost.

33. The system of claim 25 wherein executing comprises executing the isolatable component on the first grid compute resource if an error occurs during execution of the isolatable component on the second grid compute resource.

* * * * *

UNITED STATES PATENT AND TRADEMARK OFFICE
CERTIFICATE OF CORRECTION

PATENT NO. : 7,627,655 B2  Page 1 of 1
APPLICATION NO. : 11/010882
DATED : December 1, 2009
INVENTOR(S) : Bozak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1387 days.

Signed and Sealed this

Second Day of November, 2010

David J. Kappos
*Director of the United States Patent and Trademark Office*